United States Patent [19]

Campbell

[11] 4,408,203

[45] Oct. 4, 1983

[54] SECURITY SYSTEM FOR ELECTRONIC FUNDS TRANSFER SYSTEM

[75] Inventor: Carl M. Campbell, Newtown Square, Pa.

[73] Assignee: MasterCard International, Inc., New York, N.Y.

[21] Appl. No.: 205,295

[22] Filed: Nov. 10, 1980

Related U.S. Application Data

[62] Division of Ser. No. 867,924, Jan. 9, 1978, Pat. No. 4,259,720.

[51] Int. Cl.³ .......................... H04Q 9/00; H04L 9/00; G06F 15/30; G06K 5/00
[52] U.S. Cl. ............................... 340/825.34; 235/379; 235/382; 178/22.08
[58] Field of Search ..................... 340/825.31, 825.34; 178/22.08; 235/379, 382

[56] References Cited

U.S. PATENT DOCUMENTS

| | | |
|---|---|---|
| 3,764,742 | 10/1973 | Abbott et al. . |
| 3,798,359 | 3/1974 | Feistel . |
| 3,798,605 | 3/1974 | Feistel . |
| 3,852,571 | 12/1974 | Hall et al. ........................ 235/61.7 B |
| 3,956,615 | 5/1976 | Anderson et al. ................... 235/381 |
| 3,958,081 | 5/1976 | Ehrsam et al. . |
| 3,962,539 | 6/1976 | Ehrsam et al. . |
| 3,984,637 | 10/1976 | Caudill et al. . |
| 4,004,089 | 1/1977 | Richard et al. ................. 340/825.34 |
| 4,004,089 | 1/1977 | Richard et al. . |
| 4,013,894 | 3/1977 | Foote et al. .................... 340/825.34 |
| 4,074,066 | 2/1978 | Ehrsam et al. . |
| 4,075,460 | 2/1978 | Gorgens ........................ 340/825.34 |
| 4,078,152 | 3/1978 | Tuckerman, III . |
| 4,120,030 | 10/1978 | Johnstone . |
| 4,193,131 | 3/1980 | Lennon et al. ................. 340/825.34 |
| 4,193,131 | 3/1980 | Lennon et al. . |
| 4,203,166 | 5/1980 | Ehrsam et al. . |
| 4,227,253 | 10/1980 | Ehrsam et al. ........................... 375/2 |
| 4,238,853 | 12/1980 | Ehrsam et al. . |
| 4,238,854 | 12/1980 | Ehrsam et al. . |
| 4,259,720 | 3/1981 | Campbell ....................... 340/825.34 |

FOREIGN PATENT DOCUMENTS

| | | |
|---|---|---|
| 1429467 | 3/1976 | United Kingdom . |
| 1458495 | 12/1976 | United Kingdom . |
| 1460459 | 1/1977 | United Kingdom . |
| 1559962 | 1/1980 | United Kingdom . |

OTHER PUBLICATIONS

National Commission on Electronic Fund Transfers, Dec. 16, 1976, S. Jeffery, Institute for Computer Sciences and Technology National Bureau of Standards, Washington, D.C. 20234.

*Primary Examiner*—Donald J. Yusko
*Attorney, Agent, or Firm*—Brumbaugh, Graves, Donohue & Raymond

[57] ABSTRACT

A security system, particularly useful in an electronic funds transfer system, makes use of secret identification codes known only to system users. The codes are encrypted upon insertion into the system and are stored in a data processing unit in encrypted form. A security module is used to decrypt the code entered by a user and compare it to the corresponding encrypted code stored in the data processing unit.

8 Claims, 4 Drawing Figures

SECURITY SYSTEM FOR ELECTRONIC FUNDS TRANSFER SYSTEM

This is a division, of application Ser. No. 867,924 filed Jan. 9, 1978. Now U.S. Pat. No. 4,259,720 granted Mar. 31, 1981.

BACKGROUND OF THE INVENTION

This invention relates to security in data processing systems, and particularly to systems for preventing unauthorized use of a data processing system.

Unless suitable precautions are taken, data processing systems, especially automatic banking or electronic funds transfer systems, can be particularly vulnerable to fraudulent transactions. This vulnerability arises out of the fact that an unauthorized user can obtain access to the system without confrontation by another individual. Thus, in an electronic banking system a fraudulent user may secure funds from the system without the possibility of personal identification. Prior art systems for preventing fraudulent use of such systems have included the use of secret identification numbers, known only to authorized system users. These numbers are generally stored on a computer memory associated with a data processing unit. When an authorized user desires to obtain access to the system, for example to enter into a banking transaction, he must identify himself at a transaction terminal, such as an automatic banking terminal, by keying his secret identification number into the terminal. The data processing system compares the number keyed by the customer with the stored secret number corresponding to the customer's account, and if the numbers match, the transaction is authorized.

Two substantial security problems arise by the ordinary use of secret code numbers. The first problem can arise through the actions of personnel who are familiar with the data processing system. It is possible under ordinary circumstances for a dishonest employee, familiar with system programming, to obtain a computer print-out of account numbers and the corresponding secret identification code numbers. With this information available, unauthorized identification, such as a credit card or other identification indicia, can be fabricated and used at automatic banking terminals to defraud the bank. Another problem arises out of the possible use of a wire-tap on the communications link associated with a remote terminal, which can enable the surreptitious determination of secret identification numbers corresponding to customer account numbers. These numbers might then be used to defraud the bank using fabricated or stolen identification.

The problem of security in automatic banking systems becomes more complex when a system is arranged to enable a banking customer to obtain funds or merchandise at a terminal associated with a bank other than the bank at which he maintains his account. In this case, a problem of responsibility for fraudulent transactions can arise between the bank maintaining the terminal and the bank maintaining the account. This problem might preclude the establishment and successful operation of such a multiple-bank system. When secret code numbers might be compromised either by wire-tapping or by tampering with a data processing system, responsibility for fraudulent use becomes difficult to determine and it is therefore difficult to assess liability among banks operating as members of a cooperative electronic funds transfer system.

It is therefore an object of the pesent invention to provide apparatus for verifying the identity of an authorized person making use of automatic data processing equipment.

In particular, it is an object of the invention to provide security apparatus for use in electronic banking equipment.

SUMMARY OF THE INVENTION

In accordance with the invention, a system for automatically processing data entered at a terminal by an authorized person is provided with apparatus for verifying the identity of the authorized person. The apparatus includes code entry means at the terminal for receiving a secret code entered by the person and for generating input electrical signals representative of the code. Encrypting means associated with the code entry means and responsive to the input electrical signals and a first encrypting key are provided for generating encrypted electrical signals representative of the secret code encrypted by the first key. Storage means are provided for storing the value of the secret code encrypted by a second encrypting key. A security module communicating with the encrypting means and the storage means is responsive to the encrypted electrical signals and the stored encrypted secret code for decrypting the electrical signals and the code and providing an indication if the electrical signals are representative of the code. The security module is arranged to prevent output of the code in decrypted form.

The terminal may include means for entering identifying information other than the secret code and generating identifying electrical signals representative of the entered information. In this case, the storage means may store a plurality of the secret codes encrypted by the second encrypting key and include means responsive to the identifying electrical signals for selecting one of the encrypted codes and supplying the selected code to the security module. The storage means may also be arranged to store the first encrypting key in encrypted form and the security module can be used to decrypt the first key. There may be provided a plurality of terminals each of which has a unique first encrypting key. The terminals can generate terminal representative electrical signals which may be used by the storage means to select the encrypted first encrypting key corresponding to that terminal and supply the selected key to the security module.

In a variation of the invention, the security module may be used to decrypt the secret code and re-encrypt the secret code using the second encrypting key and thereby generate second key encrypted electrical signals representative of the secret code. In this case, data processing means, which includes storage means for storing secret codes encrypted by the second key can be used for comparing the second key encrypted electrical signals to the stored encrypted secret code, and provide an indication if the electrical signals are representative of the secret code. In this case, there may be provided a plurality of the second encrypting keys, each corresponding to a data processing unit. The second encrypting keys can be stored in an unsecured memory in encrypted form and provided to security module as required.

The invention is particularly useful in a system for automatically performing banking functions in response to transaction requests originated at banking terminals by banking customers. In this case, a data processing unit can be provided for interpreting a transaction message which consists of a first message portion comprising an encrypted secret customer code and a second message portion containing transaction information. If the transaction message corresponds to an account maintained by the bank associated with the banking terminal, the bank's data processing unit can interpret the transaction message and cause its security module to compare the encrypted message portion with a stored secret code. If the transaction corresponds to an account maintained by a different banking organization, the encrypted code can be re-encrypted into a new encrypted message portion which can be transmitted with the transaction message portion to the data processing unit associated with the bank at which the customer maintains his account. For additional security, the encrypted message portion can be formed using portions of the transaction message portion.

For a better understanding of the present invention, together with other and further embodiments, reference is made to the following description, taken in conjunction with the accompanying drawings and its scope will be pointed out in the appended claims.

DESCRIPTION OF THE INVENTION

Figure 1:
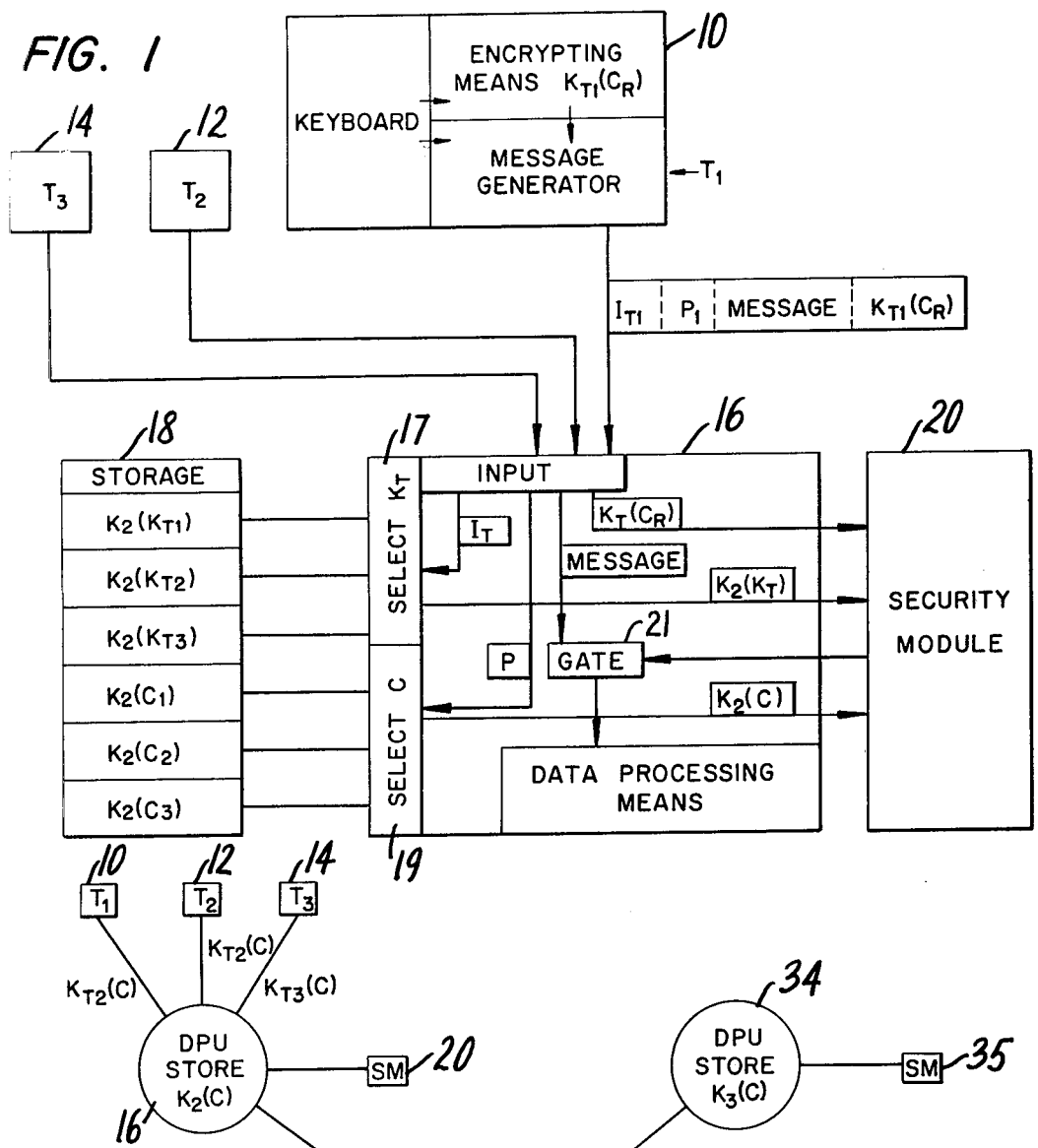
FIG. 1 is a functional block diagram of a data processing system having security apparatus in accordance with the present invention.

FIG. 1 is a functional block diagram illustrating an embodiment of the present invention. The system illustrated includes a plurality of transaction terminals 10, 12, and 14, of the type which may be used in an automatic banking system. Each terminal 10 includes a keyboard for entering information. The entered information includes a transaction message to be provided to the data processing unit 16, which may be a request for a banking transaction, such as a cash advance at the automatic banking terminal 10. In response to entries in the keyboard, or by other means such as a device for reading a magnetically encrypted card, a message is formed indicating the identification of the terminal, the identification of the person utilizing the terminal, the transaction which is requested and a secret identification code, which is manually entered by the person utilizing the terminal. The secret identification code may typically be a three to five digit number which is memorized by the person and is not revealed to any other person. The secret code which is entered at terminal 10 is provided directly from the keyboard to an encrypting device, such as a microprocessor or LSI circuit within the terminal which converts the secret code into encrypted electrical signals for transmission by terminal 10 to data processing unit 16. When the terminal is a point of sale terminal operated by a clerk, a separate keyboard may be provided on which the person utilizing the terminal may enter his secret code without disclosing the code to the clerk.

The encrypting of the secret code is carried out in accordance with an algorithm which makes use of an encrypting key. A suitable algorithm for this function has been published by the National Bureau of Standards (hereinafter NBS Algorithm) and is available from the National Bureau of Standards, Systems and Software Division, Institute for Computer Services Technology, Building 225, Room A265, Washington, D.C. 20234. The NBS Algorithm has been published in the Federal Register, Volume 40, Number 52, pages 12067–12250, Mar. 11, 1975. The Algorithm is designed to encypher and decypher blocks of data consisting of 64 bits, under the control of a 64 bit key. According to the NBS Algorithm, the number to be encoded is put through a series of operations, the nature of which is dependent on the key. The process is reversable so that once the number has been encrypted into a cypher using a particular key, the original number can be obtained from the cypher by an inverse process using the same key.

In the block diagram of FIG. 1, the key used by terminal 10 is designated $K_{T1}$. The code entered by the person using terminal 10 is designated $C_R$. The encrypted message portion generated by the encrypting device in terminal 10 is therefore designated $K_{T1}(C_R)$. The message portion representing the identification of the person operating terminal 10 is $P_1$. The message portion identifying terminal 10 is indicated as $I_{T1}$. Message portions $P_1$ and $I_{T1}$ are used in data processing unit 16 to select codes and encrypting keys from unsecured memory 18. In some arrangements, the identification of the terminal may be made by reference to the communication line on which the message is received, and the identifying signals can be generated by data processing unit 16.

Since the algorithm which is used in the encryption process is a nonsecret NBS Algorithm, it is important that the keys used in the encrypting process be maintained in secrecy, just as the personal identification codes are maintained in secrecy. In an establishment such as a bank wherein a large number of employees may have access to the data processing unit, it is difficult to maintain such codes and keys in a memory in a manner which prevents access by personnel operating the data processing unit 16. For this reason, the codes and keys are stored in a storage device 18 in an encrypted form. The encrypting at the data processing unit 16 is performed by a security module 20. This module is the only location wherein memory states or signals representing the unencrypted form of keys or codes may exist, and most of these exist in the security module 20 only for a brief period of time.

Security module 20 is preferably housed separately from data processing unit 16 and is provided with separate controls and programs which preclude the output from security module 20 of the unencrypted form of identification codes or the keys for terminals 10, 12, and 14. Security module 20 is provided with a master key, designated $K_2$ in FIG. 1. This key is used for encrypting the terminal keys, $K_{T1}$, $K_{T2}$ and $K_{T3}$ corresponding to terminals 10, 12, and 14 repsectively and is also used to encrypt customer identification code numbers $C_1$, $C_2$, and $C_3$ so that all of these numbers may be stored in an encrypted form in unsecure memory 18. Master key $K_2$ is stored only within security module 20 which is arranged to prevent access to the master key. By storing the encrypted form of the keys and codes in unsecure memory 18, a dishonest bank employee is precluded from obtaining the unencrypted form of these keys and codes. It is possible for a banking employee to manipulate data processing unit 16 and thereby obtain a print-out of account numbers and encrypted codes. The encrypted codes cannot be decyphered by the dishonest employee in the absence of knowing the master key, $K_2$ which is stored only in security module 20. Preferably, the master key $K_2$ is contained in a device which will self-destruct upon tampering with security module 20, and the security module itself is maintained in a secure area of the bank's facility. The functions performed by the security module are primarily performed by the use of large scale integrated circuits, so that the physical size of the module is relatively small. Since the encrypted secret code numbers and keys are stored in a memory 18 external to the security module, the module itself requires only a relatively small amount of read-write memory. Rather than a single master key $K_2$, it is possible to provide multiple master keys in the security module, each for a different function. One master key can be used for encrypting codes, another for encrypting keys, and another for controlling access to the operation of the security module.

When data processing unit 16 receives a message from a terminal, for example terminal 10, which requests that a transaction be authorized, the data processing unit supplies the terminal identification portion of the message $I_{T1}$ to a first selecting apparatus 17 and the customer identification portion of the message $P_1$ to a code selecting apparatus 19. Apparatus 19 selects the customer's encrypted code number from memory 18, and apparatus 17 selects the appropriate key, also in encrypted form, form memory 18. The encrypted key and code are supplied to security module 20, where they are decrypted using master key $K_2$. The decrypted terminal key $K_t$, is used to decrypt the secret code number entered by the customer at the terminal. The two decrypted secret code numbers are compared in security module 20, and if they are identical, a message is provided to open gate 21 in the data processing unit, and provide the transaction message portion to a data processing means for transaction processing. If the codes do not correspond, a rejection message is provided to data processing unit 16 and closed gate 21 prevents further processing of the transaction request. Typically, gate 21 is merely a software controlled function in the data processing unit.

Figure 2:
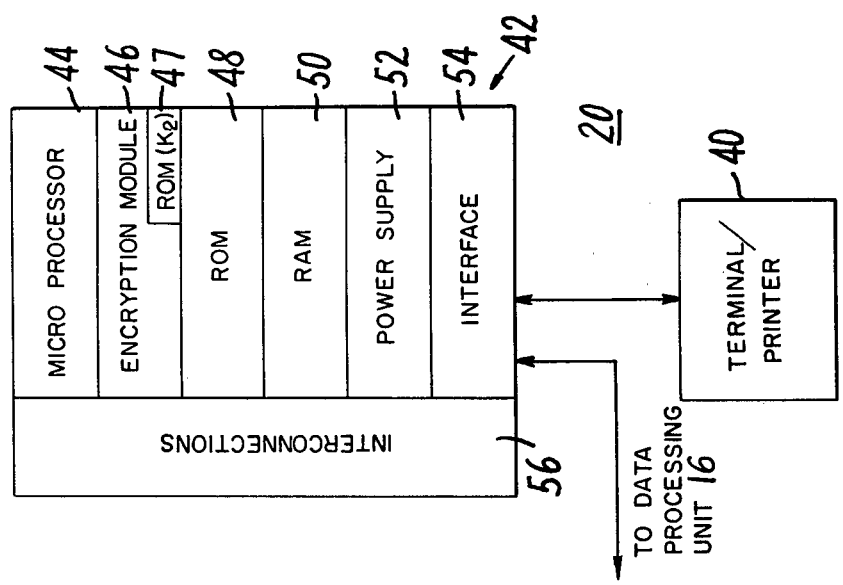
FIG. 2 is a block diagram illustrating the details of the security module used in the FIG. 1 system.

FIG. 2 is a block diagram illustrating the component hardware parts of security module 20. The module may include data processing apparatus 42 and an input/output device 40 such as a terminal, a printer or both. Apparatus 42 performs most functions for processing of customer code signals by direct interface with data processing unit 16. Terminal 40 is used only for special functions of the security module, such as entry of customer code numbers as will be discussed below. Data processing apparatus 42 is fabricated entirely from available microcomputer components, which are mounted in a suitable chassis and provided with a power supply 52. The components are tied together by interconnections 56 which provide data, control and address channels.

Data processing apparatus 42 is operated under the control of microprocessor 44 in accordance with programs stored in read-only-memory (ROM) 48. Data input and output from the data processing unit 16 or terminal 40 is provided by interface circuit 54, whose operation is controlled by microprocessor 44. Typically such input and output will be in serial format, while interconnection data will be in parallel format. The encryption module 46 is a special purpose microprocessor which performs the encrypting and decrypting functions according to the NBS Algorithm. The master key for the security module is contained in a read-only-memory (ROM). The master key can be changed only by replacing or re-programming this ROM. Random access memory (RAM) 50 is used to store intermediate data, perform input/output buffering, and store message format definitions. It may be a part of microprocessor 44 or a separate memory.

Motorola Semiconductor Products, Inc., Phoenix, Ariz., produces microprocessor components suitable for use in the security module. The components and their functions are as follows:

| Motorola Part Number | Description | Function |
| --- | --- | --- |
| M68 MMCCL | 10 Card Chassis | Chassis, power supply 52 and interconnections 56. |
| M68MM01A | Microcomputer | Microprocessor 44 and RAM 50. |
| MSG6800 DSM | Data Security Module | Encryption Module 46 including ROM 47. |
| MEX6850 | ACIA Module | Interface 54 |
| M68MM04-1 | EROM Module | Read only memory 48. |
| MCM687808 | ROM | Read only memory 48. |

The capacity of the ROM and RAM memories required necessarily depends on the number and nature of different programmed operations the security module must handle.

In a typical operation, for example, comparing a received encrypted code to a code which was stored in the data processing unit 16 using a different key, the following operation may take place. Interface 54 receives a control signal indicating the function to be performed and data representing the received encrypted code $(K_{T1} (C_R))$, stored encrypted code $(K_2 (C_1))$ and encrypted terminal key $(K_2 (K_{T1}))$. The control signal causes microprocessor 44 to select an appropriate program from the ROM and acting under that program store the received data in the RAM. The microprocessor then provides the data in appropriate sequence, with instructions, to the encryption module 46. The encryption module will perform the following functions:

(1) Decrypt $K_{T1}$ using $K_2$
(2) Decrypt $C_R$ using $K_{T1}$
(3) Decrypt $C_1$ using $K_2$ The decrypted $C_R$ and $C_1$ stored in the RAM, 50 and then compared by the microprocessor 44. The microprocessor 44 will then generate an appropriate output message indicating a correct or incorrect $C_R$ and provide the output message to data processing unit 16 by interface 54. The values of $C_R$ and $C_1$ are then erased in the RAM 50 and encryption module 46. The programming prevents these values from being supplied as outputs in unencrypted form.

When new customers are to be added to the system it becomes necessary to have direct access to the secret codes in unencrypted form. For this function, terminal 40 is advantageously provided in a secure location in direct communication with the security module data processing apparatus. A secret code number selected by the customer can be entered at a terminal. The security module can then encrypt the number according to a stored program and supply the customer's account number and the secret code number in encrypted from for storage to data processing unit 16. Alternately, the secret code number can be generated by the security module, for example, by encrypting the account number, and supplied to an output printer 40 to be forwarded to the customer under secure conditions.

An alternative to a separate security module terminal or printer 40 is to permit use of input/output devices associated with data processing unit 16 for printing secret codes to be forwarded to customers. This possibility is necessarily less secure, and requires special measures to secure the area containing the computer and its peripherals prior to such use.

It will be recognized that the ROM of data processing apparatus 42 may include many other security related programs for performing the various functions required by the various modifications of the invention.

Those skilled in the art will recognize that variations of the encrypting and decrypting process may be advantageous. For example, it may be advisable to cause the terminal 10 to encrypt the secret code according to terminal key $K_{T1}$ and to use portions of the transaction message in the encrypting process. In this way, the security module 20 can also verify the accuracy of the transaction message as received by data processing unit 16, since that message must be used to get a correct decrypting of the secret code.

Figure 3:
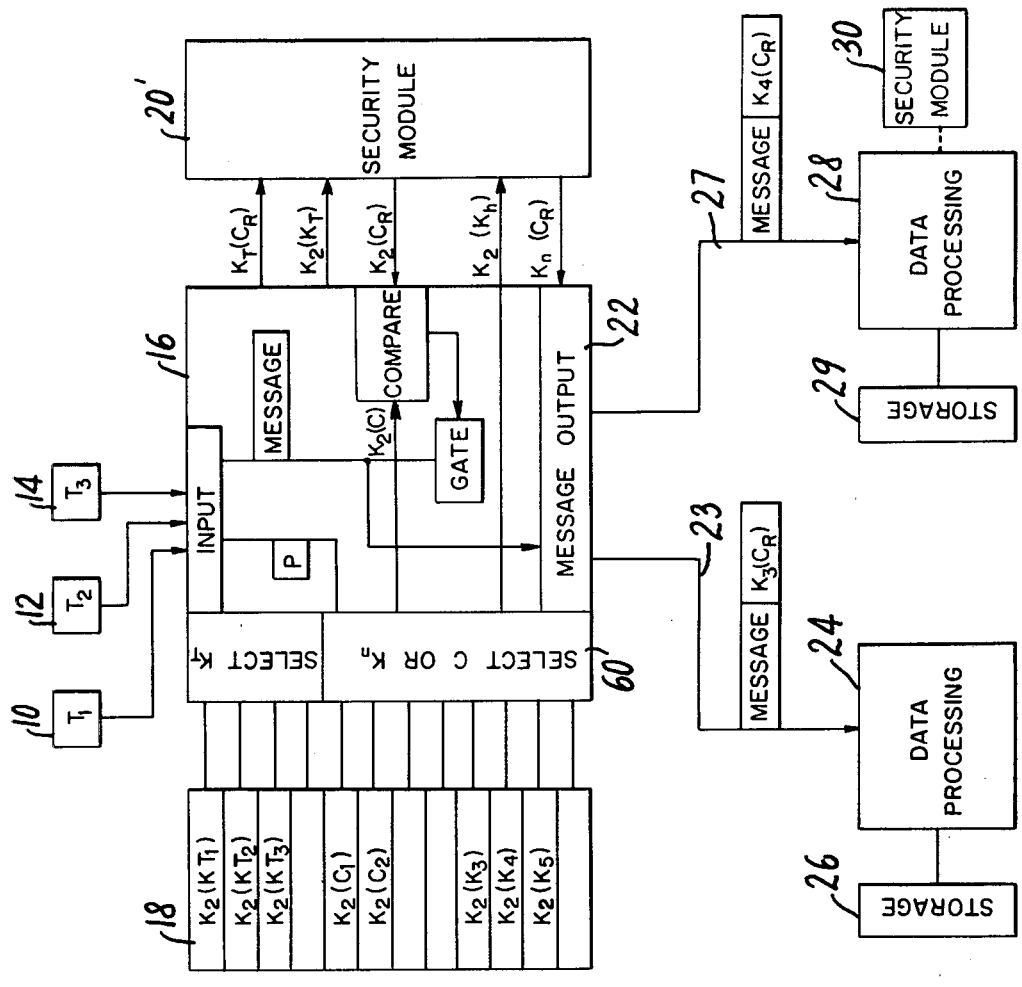
FIG. 3 is a functional block diagram illustrating an alternate arrangement of the present invention.

FIG. 3 illustrates in block diagram an embodiment of the invention which is usable in an electronic funds transfer system wherein a plurality of data processing units are tied together by communication lines to effect fund transfers between accounts in various banks. In this system, a customer of one bank can make use of a terminal which is connected to the data processing unit of another bank. When a message is received from a terminal by data processing unit 16, the identification of the terminal customer is provided to a selecting circuit 60. If the identification indicates that the terminal is serving a customer of the bank which maintains data processing unit 16, the selecting unit will select the customer's encoded identification number from memory 18. On the other hand, if the data processing unit 40 determines that the individual being served by the terminal has an account at a different bank, it is necessary for the selecting unit to select an encrypted code corresponding to that bank. These encrypted codes are designated $K_3$, $K_4$, and $K_5$. In the embodiment illustrated in FIG. 3, the security module is used only for decrypting and encrypting functions and does not perform the comparison function which is performed by the security module 20 illustrated in FIG. 1. Security module 20' uses a master key $K_2$ associated with data processing unit 16 to decrypt the terminal key $K_T$ and decrypt the code number using the decrypted terminal key $K_T$ if the code corresponds to a customer of the bank with which data processing unit 16 is associated. If the customer maintains his account at another bank, it is necessary for the security module 20' to decrypt the key corresponding to that other bank and use that decrypted key to re-encrypt the customer's identification code for transmission to the data processing unit of the customer's bank where verification of the correctness of the secret identification code is performed.

Comparison of the stored codes and received encrypted codes in the embodiment of FIG. 3 is made in the data processing unit by comparing the secret code numbers in encrypted form. Thus, when an encrypted code number is received from a terminal, it is supplied to the security module which decrypts the code number using the terminal key, and re-encrypts it using the master key $K_2$. The data processing unit 16 can therefore compare, in an unsecured environment, the code entered at the terminal with the stored code, both of which are encrypted using the master key $K_2$. If the code is to be transmitted to a different data processing unit for verification, security module 20' decrypts the code using the terminal key and re-encrypts the code using a key corresponding to the other data processing unit ($K_3$, $K_4$, etc.). Both the these keys are supplied to the security module 20' in encrypted form, and the security module uses its own master key, $K_2$, to decrypt these encrypted keys prior to decrypting and re-encrypting of the secret identification code.

The systems of FIG. 3, wherein the security module 20' re-encrypts the secret code entered by the customer in a key which is unknown to the data processing unit 16 except in encrypted form, enables another data processing unit 24 to participate in the system without the use of a security module. When a transaction request originated at a terminal 10, 12, or 14 associated with data processing unit 16 is determined to correspond to an account which is maintained by an institution associated with data processing unit 24, the secret code number entered by the customer at the terminal is re-encrypted by security module 20' and transmitted by communications line 23 along with other transaction message portions, which are unencrypted, to data processing unit 24, which is associated with the bank with which the customer maintains an account. Data processing unit 24 has a record of the customer's secret code number in encrypted form in storage unit 26. If there is no security module associated with data processing unit 24, the secret code number may be stored in storage unit 26 encrypted by the key $K_3$. Thus, the encrypted identification code, which is received by data processing unit 24, can be directly compared to the encrypted identification number maintained in storage unit 26 to determine if the transaction has been requested by an authorized person.

If there is a security module at the receiving data processing unit, the key by which the secret code number is encrypted for transmission for example, to data processing unit 28, may be used merely for transmission between data processing units. Data processing unit 28 receives messages over communications line 27 which include an identification code encrypted according to key $K_4$. The identification code itself may be stored in an unsecure storage unit 29 associated with data processing unit 28 encrypted by a different key. Thus, the key by which data processing unit 28 maintains its records is not revealed even in encrypted form to the institution having data processing unit 16 or its associated security module 20', thereby reducing the possibility that the contents of storage unit 29 can be comprised. A security module 30 associated with data processing unit 28 can decrypt the message according to key $K_4$ and re-encrypt it according to another key for comparison with the encrypted identification code stored in storage unit 29. Those skilled in the art will recognize that there may be terminals associated with data processing unit 28, and storage unit 29 may include keys associated with those terminals, (as well as) keys which are associated with different data processing units in the system, as well as the encrypted identification codes associated with the customers of the institution at which data processing unit 28 is located.

Figure 4:
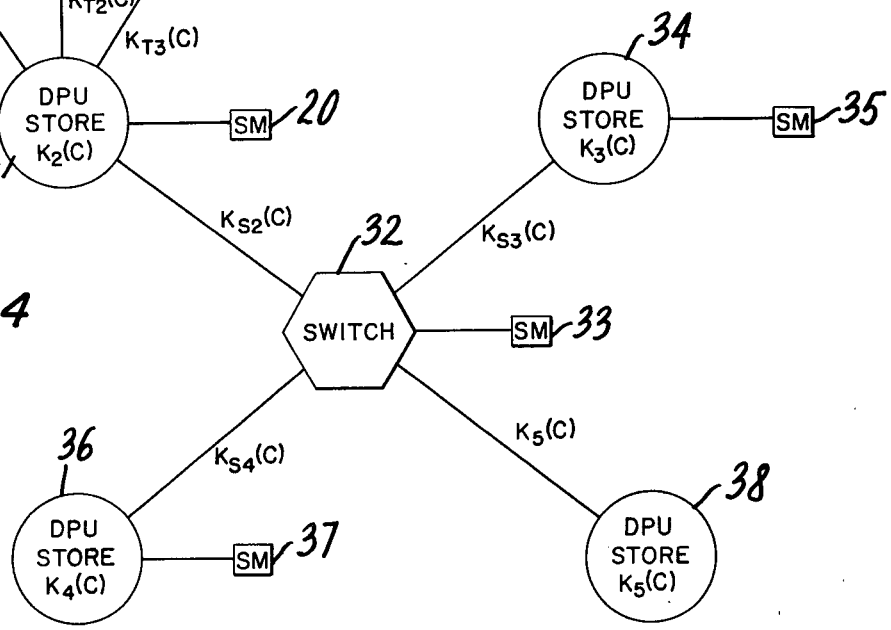
FIG. 4 is a block diagram illustrating an electronic funds transfer system which includes the security apparatus of the invention.

FIG. 4 is a block diagram illustrating a full electronic funds transfer system wherein a plurality of banks or other financial institutions are linked together by a central switching unit 32. Included are data processing units 16, 34, 36, and 38 which may be associated with different banks or financial institutions. Data processing unit 16 includes transaction terminals 10, 12, and 14 which are connected to data processing unit 16 by communication lines. There is also provided a security module 20 associated with data processing unit 16. Transactions originating at one of the terminals 10, 12, or 14 are transmitted to the processing unit with the secret code encrypted according to a key corresponding to the individual terminal. Thus, there are provided keys $K_{T1}$, $K_{T2}$, and $K_{T3}$. When the transaction involves an account which is maintained by a different data processing unit, the encryption of the secret code is changed by security module 20 so that the transaction message is transmitted to switch 32 with an encryption according to a key $K_{s2}$ which is known to the security module 33 associated with switch 32 and the security module 20 associated with central processing unit 16. According to its destination, the secret code is again re-encrypted by security module 33 to another encrypting key for further transmission to the data processing unit at the institution wherein the account is maintained. In the case of data processing unit 34 and 36, transmission is accomplished using an encrypting key known to security modue 33 and which can be determined by the corresponding security module 35 or 37 at the data processing unit wherein the account is maintained. Thus, if the transaction involves an account maintained at data processing unit 36, the identification code is transmitted to that data processing unit from switch 32 encrypted according to a key $K_{s4}$. At data processing unit 36, security module 37 re-encrypts the codes according to another key $K_4$ under which the secret code is maintained in storage at data processing unit 36. Likewise, security module 35 at data processing unit 34 will re-encrypt the code using key $K_3$, according to which records are maintained at data processing unit 34.

As indicated in the diagram of FIG. 4, it is possible for some of the data processing units in the system, for example data processing unit 38, to dispense with the requirement for a security module. This is particularly applicable when the data processing unit does not have transaction terminals associated with it, but merely wishes to provide its own customers access to terminals maintained by other data processing units in the system. In this case, the security module 33 associated with the switch 32 can encrypt the secret code associated with a transaction message in a key $K_5$ under which the secret codes are stored at data processing unit 38. The data processing unit can then compare the encrypted code, as received over the communication line, with the encrypted code as maintained in its own storage, without the need for decrypting, or re-encrypting. This system is less secure than a system using a security module, and may be subject ot fraudulent use by personnel with access to the data processing unit.

Appendix 1 to applicant's prior application Ser. No. 867,924, filed Jan. 9, 1978, now U.S. Pat. No. 4,259,720 granted Mar. 31, 1981 is a print-out of a program suitable for use with the Motorola microprocessor and peripheral equipment listed above. The program is primarily in Motorola M6800 assembly language, but portions of the program are in special language which is defined by the program. Certain portions of the program listing have been deleted to prevent dissemination of security measures not pertinent to the invention. The program contemplates the use of subroutines DESENC and DESDEC to encrypt and decrypt numbers according to the NBS algorithm using the microprocessor rather than the data security module hardware listed above. These subroutines for implementing the NBS algorithm can be generated by a skilled programmer or can be eliminated by the data security module hardware. Appendix II is a list of functions identified by various labels used in the program. These definitions are included as an aid to understanding the program itself.

Those familiar with data processing systems will recognize that the security apparatus of the present invention may be used to limit access to data stored in data processing equipment, other than that associated with banking functions. In some cases, such access will be restricted to protect the secrecy of private or commercial information stored in a data processing unit, or to prevent unauthorized use or tampering with data processing equipment.

While there have been described what are believed to be the preferred embodiments of the invention, those skilled in the art will recognize that other and further modifications may be made thereto without departing from the spirit of the invention, and it is intended to claim all such embodiments as fall within the true scope of the invention.

I claim:

1. In a system having a data processing unit and at least one transaction terminal, for automatically processing data entered at said terminal by an authorized person, apparatus for verifying the identity of said authorized person, comprising:

manual code entry means at said terminal, for receiving a secret code entered by said person and for generating first electrical signals representative of said code;

encrypting means at said terminal, associated with said manual code entry means, and responsive to said first electrical signals and a first encrypting key, for generating second electrical signals representative of said secret code encrypted by said first key;

means at said terminal for receiving identifying information other than said secret code, and for generating third electrical signals representative of said identifying information;

storage means, associated with said data processing unit for storing a plurality of signals representative of a plurality of said secret codes, each encrypted by a second encrypting key, said storage means including means responsive to said third electrical signals for selecting one of said encrypted stored codes;

a security module, separate from said data processing unit and in communication therewith, responsive to said second electrical signals and said selected encrypted stored code, for decrypting said second electrical signals and said selected encrypted stored code and for providing an output indication to said data processing unit if said second electrical signals are representative of said selected stored code, said security module being operationally arranged to prevent output of said code in decrypted form;

and system enabling means, associated with said data processing unit, and responsive to said output indication for allowing the automatic processing of data entered by said person at said terminal.

2. Apparatus as specified in claim 1 wherein said storage means additionally stores said first encrypting key in encrypted form and wherein said security module decrypts said first key.

3. Apparatus as specified in claim 2 wherein there are provided a plurality of said terminals, each of said terminals having a unique first encrypting key, wherein there are provided means for generating fourth electrical signals representative of terminal identity, wherein said storage means stores said unique first encrypting key for each of said terminals and wherein said storage means includes means, responsive to said fourth electrical signals, for selecting one of said encrypted first encrypting keys and supplying said selected key to said security module.

4. In a system having a data processing unit and at least one transaction terminal, for automatically processing data entered at said terminal by an authorized person, apparatus for verifying the identity of said authorized person, comprising:

manual code entry means at said terminal, for receiving a secret code entered by said person and for generating first electrical signals representative of said code;

encrypting means at said terminal, associated with said manual code entry means, and responsive to said first electrical signals and a first encrypting key, for generating second electrical signals representative of said secret code encrypted by said first key;

means at said terminal for receiving identifying information other than said secret code, and for generating third electrical signals representative of said identifying information;

a security module, separate from said data processing unit and in communication therewith, and responsive to said second electrical signals for decrypting said second electrical signals to derive said first electrical signals, and for re-encrypting said first electrical signals using a second encrypting key to derive fourth electrical signals representative of said secret code encrypted by said second key, and for providing said fourth electrical signals as an output to said data processing unit, said security module being operationally arranged to prevent output of said first electrical signals;

storage means, associated with said data processing unit for storing a plurality of signals representative of a plurality of said secret codes, each encrypted by a second encrypting key, said storage means including means responsive to said third electrical signals for selecting one of said encrypted stored codes;

and system enabling means, responsive to said selected encrypted stored code and said fourth electrical signals, for comparing said code and said signals and allowing the automatic processing of data entered by said person if said code and said signals are the same.

5. Apparatus as specified in claim 4 wherein there are provided a plurality of said data processing means, each having a unique second encrypting key, wherein there are provided means, including a memory for storing said second encrypting keys, associated with said security module and responsive to said third electrical signals, for selecting one of said second encrypting keys and supplying said selected second key to said security module.

6. Apparatus as specified in claim 5 wherein said memory stores said second encrypting keys in encrypted form and wherein said security module decrypts said second encrypting keys.

7. Apparatus as specified in claim 1 wherein there are provided a plurality of said terminals, each of said terminals having a unique first encrypting key, wherein there is provided a memory associated with said security module for storing said first encrypting keys, wherein there are provided means for generating fifth electrical signals representative of terminal identity, and wherein there are provided means associated with said security module and responsive to said fifth electrical signals, for selecting one of said first encrypting keys.

8. Apparatus as specified in claim 7 wherein said memory stores said first encyrpting keys in encrypted form and wherein said security module decrypts said first encrypting keys.

* * * * *

UNITED STATES PATENT AND TRADEMARK OFFICE
CERTIFICATE OF CORRECTION

PATENT NO. : 4,408,203

DATED : October 4, 1983

INVENTOR(S) : Carl M. Campbell

It is certified that error appears in the above-identified patent and that said Letters Patent is hereby corrected as shown below:

```
Column 6, line 49, after "C1" insert -- are --
Column 8, line 9, "the" should read -- of --
Column 12, line 30, "claim 1" should read -- claim 4 --.
```

Signed and Sealed this

Ninth Day of October 1984

[SEAL]

Attest:

*Attesting Officer*

GERALD J. MOSSINGHOFF

*Commissioner of Patents and Trademarks*